Jan. 7, 1936.  H. D. GEYER  2,026,625
RESILIENT MOUNTING UNIT
Filed Oct. 26, 1933
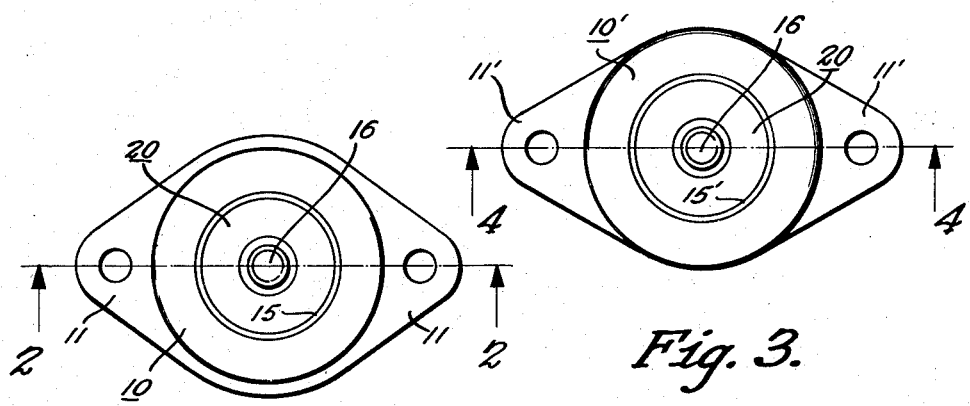
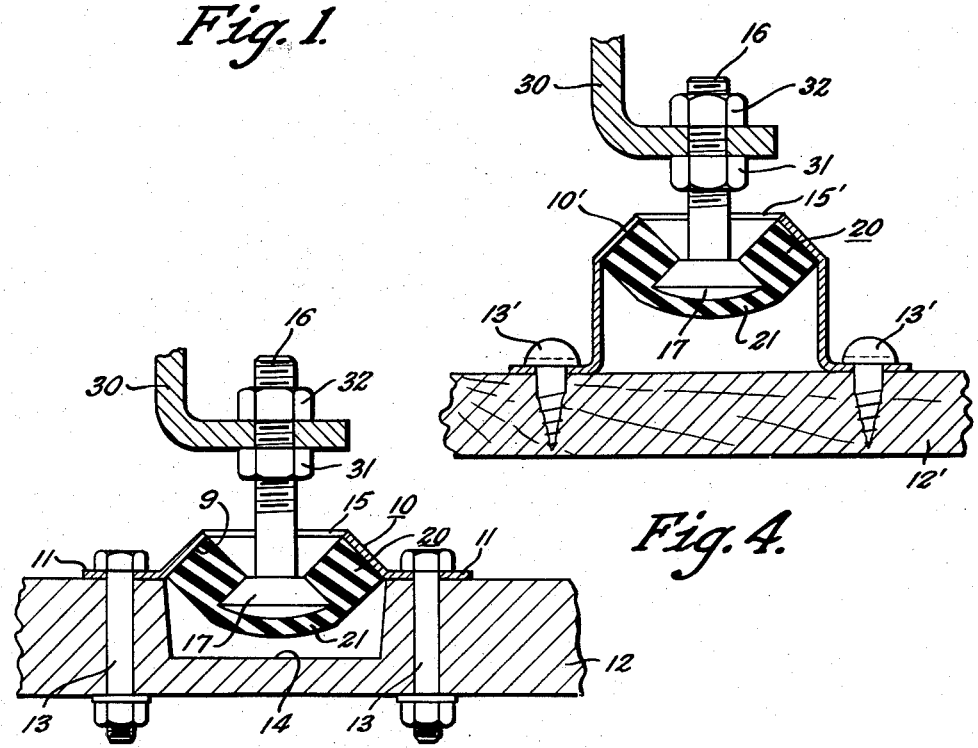
INVENTOR
Harvey D. Geyer
BY
Spencer Hardman & Fehr
HIS ATTORNEYS Patented Jan. 7, 1936

2,026,625

UNITED STATES PATENT OFFICE 2,026,625

RESILIENT MOUNTING UNIT

Harvey D. Geyer, Dayton, Ohio, assignor, by mesne assignments, to General Motors Corporation, Detroit, Mich., a corporation of Delaware Application October 26, 1933, Serial No. 695,275

6 Claims. (Cl. 248—22)

This invention relates to yieldable mounting units having non-metallic yieldable material such as rubber interposed between metal parts so as to break all metallic connection between the connected members, such as an electric motor or other device and its support.

An object of this invention is to provide a very efficient, simple and economically made resilient mounting unit which can be simply attached to and adjusted upon the supported member and its base.

A special object is to provide such a mounting unit wherein a cup-shaped resilient rubber block is bonded by vulcanization in situ to metal parts and arranged in such manner that the weight of the supported member is sustained by tension in the resilient rubber cup rather than by compression.

Further objects and advantages of the present invention will be apparent from the following description, reference being had to the accompanying drawing, wherein a preferred embodiment of one form of the present invention is clearly shown.

In the drawing:

Fig. 1 is a plan view of a small mounting unit made according to this invention and adapted for use in mounting upon a support a small electric motor, typewriter, storage battery, or any other device where a quite resilient cushion mounting is desired.

Fig. 2 is a section on line 2—2 of Fig. 1 but shows in addition portions of the connected members.

Fig. 3 is a plan view of a modification.

Fig. 4 is a section on line 4—4 of Fig. 3 but also shows portions of the connected members.

Similar reference characters refer to similar parts throughout the several views.

10 designates a cone-shaped metal base, preferably a steel stamping, having apertured ears 11 by means of which this base may be readily secured to the supporting member 12 by suitable screws or bolts 13 (see Fig. 2). The cone-shaped base 10 has a central hole 15 of substantial diameter. A bolt 16 having a chamfered head 17 of suitable size may conveniently be used as the isolated metal member to which the supported motor or other device is to be later rigidly attached. The bolt head 17 and the under conical surface 9 of base 10 are first brass plated, and then these parts are properly set within a vulcanizing mold and the resilient rubber cup-shaped block 20 molded to the form shown in Fig. 2 and simultaneously strongly bonded by vulcanization in situ to the brass plated surface 9 and bolt head 17. Preferably the conical surface 9 of base 10 is made substantially parallel and concentric with the conical surface of bolt head 17 (as illustrated in Fig. 2). Hence a vertical down load on the bolt 16 will put all parts of the interposed cone-shaped rubber block 20 in equal direct tension, in other words, the inner fibers of the cone-shaped rubber block will be stressed equally with the outer fibers thereof since the metal surfaces move apart at an equal rate. This feature minimizes any tendency of the rubber to be progressively stripped from its bond to the metal surfaces 9 and 17 and hence the maximum load which the mount is capable of sustaining is greatly increased. Also since all portions of the rubber block are substantially equally stressed for any given down movement of the bolt head 17 the cushioning action of the mount is rendered smoother and more efficient.

Preferably the conical portion of the rubber block 20 is made thicker than the angular dimension of the head 17 and the portion 21 of the rubber block fills in the space beyond the head 17, thus imbedding the head 17 in the rubber. Obviously the rubber portion 21 will also be under tension when bolt head 17 moves down. This feature also obviously facilitates the molding of the rubber block in the disc.

Fig. 2 shows the resilient mount properly fixed to the apertured leg 30 of the supported member by means of the two nuts 31 and 32 which readily permit the vertical adjustment of the legs of the supported member in order to properly level same. The support 12 has a recess 14 therein of suitable depth into which the rubber block 20 projects when the base 10 is rigidly fixed thereto by the screws 13.

In operation, the weight of the supported member is resiliently cushioned by tension upon the cup-shaped rubber block 20 as described in detail above. The bolt head 17 obviously may have a very easy universal movement by internal distortion of the rubber block 20 and with very little stress upon the rubber. Up movement of the bolt head 17 will finally be resisted by the equal compression of the portion of the rubber lying between bolt head 17 and the conical surface 9. Lateral movement of the bolt 16 will be relatively highly resisted since obviously the rubber cup 20 exerts a relatively strong force to keep the bolt head 17 in the center of the base 10. It is thus seen that this simple mounting unit provides relatively easy vertical movement of the supported member 30 but at the same time cushions its lateral movement with a relatively strong force.

The form of the invention shown in Figs. 3 and 4 is similar to that described above in connection with Figs. 1 and 2 and operates in a like manner. However, in this form no recess is required in the support 12' since the base 10' is made with sufficient height to render such a recess unnecessary, as will be clear from Fig. 4. This form of the invention is adapted for use in mounting devices upon a table or floor where it is desired to avoid cutting recesses therein, such as typewriters, sewing machines, mechanical refrigerators, washing machines, or any kind of vibrating device where it is desired to dampen its vibration and noise of operation.

While the form of embodiment of the present invention as herein disclosed, constitutes a preferred form, it is to be understood that other forms might be adopted, all coming within the scope of the claims which follow.

What is claimed is as follows:

1. A yieldable mounting unit for connecting two members, comprising: a metal base adapted to be fixed to one of the connected members and having a recess therein, said recess having an opening and a cone-shaped wall surrounding said opening, a metal head located substantially on the axis of said conical wall and having a shank portion projecting through said opening and adapted to be fixed to the other connected member, and a dome-shaped resilient rubber block having its periphery bonded by vulcanization in situ to said cone-shaped wall and its central portion bonded by vulcanization to said metal head.

2. A yieldable mounting unit for connecting two members, comprising: a base having a conical metal wall and a central opening therein and having means for fixing to one of the connected members, a metal head located within said base below said conical wall and having a shank portion projecting upwardly through said opening and adapted to be fixed to the other connected member, and an inverted dome-shaped resilient rubber block having its periphery bonded by vulcanization to said conical wall and having its central portion bonded by vulcanization to said head and arranged in such manner that down loads on said head put the rubber block in tension.

3. A yieldable mounting unit for connecting two members, comprising: a metal base having a central aperture therein and having means for fixing to one of the connected members, a metal head within said base and having a shank portion projecting upwardly through said aperture and adapted to be fixed to the other connected member, and a resilient rubber block substantially cone-shaped when in non-distorted condition and isolatingly connecting said head and base and bonded by vulcanization to said head and base and arranged in such manner that down loads on said head put the conical walls of said rubber block in tension.

4. A yieldable mounting unit for connecting two members, comprising: a metal base having a central aperture therein and having means for fixing to one of the connected members, a metal head within said base and having a shank portion projecting upwardly through said aperture and adapted to be fixed to the other connected member, and a cone-shaped resilient rubber block isolatingly connecting said head and base and bonded by vulcanization to said head and base, said head and base having inclined mutually parallel surfaces to which said rubber is bonded.

5. In combination, a support, a member supported thereby, a yielding mounting unit connecting said member to said support, said unit comprising: a metal housing fixed to said support and having a central aperture in its upper wall, a metal head within said housing and having a shank projecting upwardly through said aperture in spaced relation therewith and fixed to said supported member, and a resilient rubber block substantially cup-shaped when in non-distorted condition and having its upper periphery secured to said metal housing around said aperture and having its central portion secured to said metal head, said resilient rubber yieldably sustaining said supported member by tension in the side walls of said cup.

6. In combination, a support, a member supported thereby, a yielding mounting unit connecting said member to said support, said unit comprising: a metal housing fixed to said support and having a central aperture in its upper wall, a metal head within said housing and having a shank projecting upwardly through said aperture in spaced relation therewith and fixed to said supported member, and a resilient rubber block substantially dome-shaped when in non-distorted condition and having its larger end extending upwardly and bonded by vulcanization to said metal housing and having its smaller end extending downwardly and bonded to said metal head, said dome-shaped block yieldably sustaining said supported member by tension in the sloping walls thereof.

HARVEY D. GEYER.